Sept. 15, 1942.	C. I. HALL	2,296,030
GAS ANALYSIS APPARATUS
Filed Feb. 9, 1940
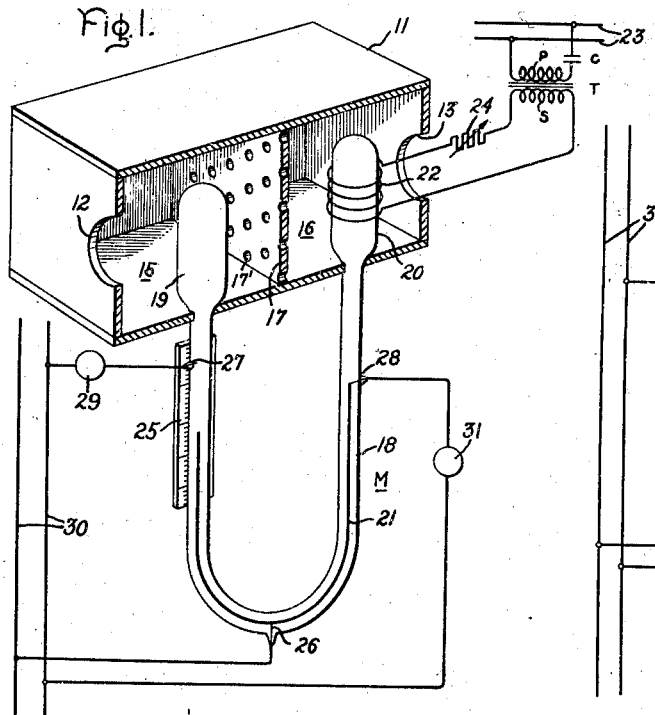
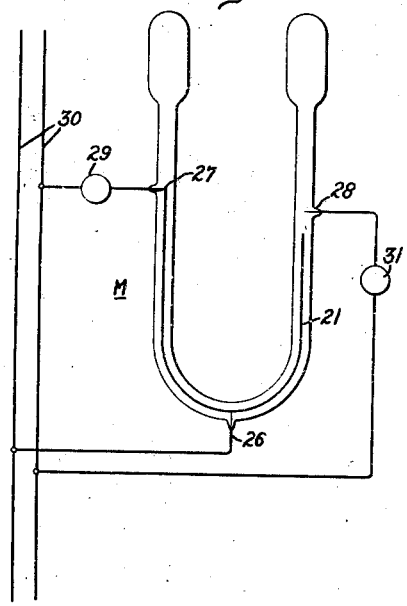
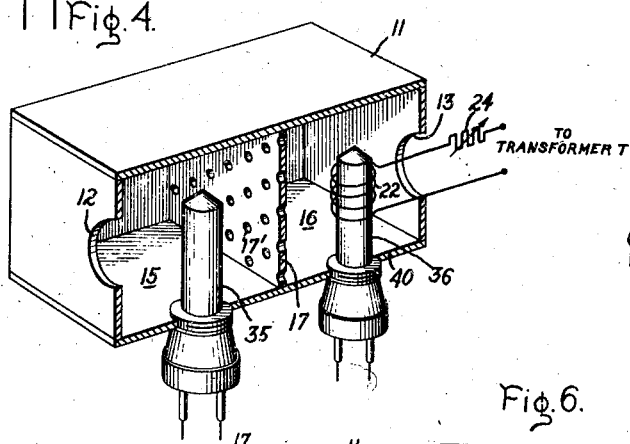
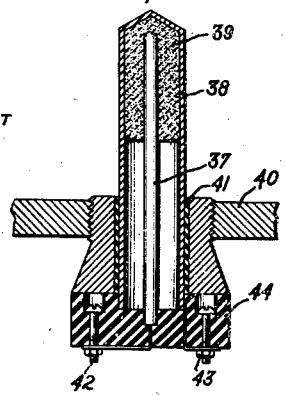
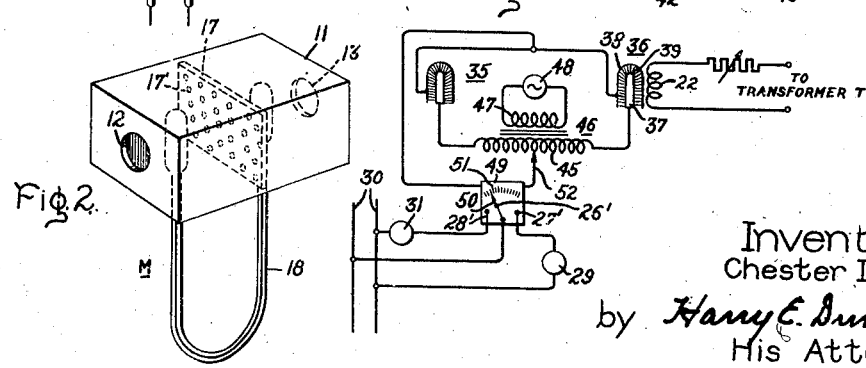
Inventor:
Chester I. Hall,
by Harry E. Dunham
His Attorney Patented Sept. 15, 1942

2,296,030

UNITED STATES PATENT OFFICE 2,296,030

GAS ANALYSIS APPARATUS

Chester I. Hall, Schenectady, N. Y., assignor to General Electric Company, a corporation of New York Application February 9, 1940, Serial No. 318,104

6 Claims. (Cl. 73—51)

This invention relates to gas analysis apparatus and more particularly to apparatus for the determination and continuous indication of the degree of or percentage purity of gases.

Heretofore, in the detection or measurement of a known constituent in a gaseous mixture by the thermal conductivity method, it has been the practice to compare the thermal conductivity of the gaseous mixture to be analyzed with that of a gas of known composition called a "standard" or "reference" gas. In making this comparison it is customary to employ two electrically heated thermo-sensitive elements, such as temperature responsive resistances, connected in two of the arms of a Wheatstone bridge, one of the resistance elements being immersed in the gas under observation and the other being positioned in a sealed envelope containing air or some other desired gas, always under fixed conditions. Under such conditions the equilibrium temperature attained by the thermo-sensitive elements will depend mainly upon the rate of loss of heat of each element or the ability of the gas surrounding each element to conduct heat, this temperature being lower when the gas has a high thermal conductivity and higher when the gas has a low conductivity. If the temperature sensitive element has a high temperature coefficient of electrical resistance, this resistance will have a value dependent on the thermal conductivity and will therefore correspond to the composition of the surrounding gas. Thus, if the two-temperature sensitive resistance elements are exposed to gases having different thermal conductivities, the quantities of heat given off by or the rate of heat loss of each of these elements to the respective gases will be different, with the result that one of the resistance elements will be maintained at a higher temperature than the other. This difference in temperature will result in a difference in the resistance of the two elements thereby causing a deflection of a galvanometer in the bridge circuit or necessitating an adjustment of the bridge to produce a state of balance, the magnitude of this deflection or adjustment being dependent upon the difference between the thermal conductivities of the two gases.

It is an object of my invention to provide a new and improved apparatus for determining and continuously indicating the degree of or percentage purity of a given gas.

It is another object of my invention to provide improved apparatus for analyzing gases which depends on the thermal conductivity of the gas under investigation but which does not necessitate the use of a "standard" or "reference" gas.

It is also an object of my invention to provide gas analysis apparatus which is of simple construction and which is characterized by high sensitivity.

In accordance with my invention in its preferred form, both of the temperature sensitive devices are immersed in spaced relation in the gas under investigation. I preferably mount a perforated shield or baffle member between the two temperature sensitive devices to reduce radiation. Heat is applied to one of the temperature sensitive devices and under such conditions the temperature variation between the two devices is a function of the thermal conductivity of the gas. The ratio of these temperature may be measured by any suitable means such as a mercury manometer or temperature sensitive resistance elements connected in a bridge circuit. After an empirical calibration has been made the quantitative composition of the gas mixture may be rapidly and accurately determined from this ratio.

The novel features which I believe to be characteristic of the invention are set forth with particularity in the appended claims. My invention itself, however, both as to its organization and method of operation together with further objects and advantages thereof may be best understood by reference to the following description when considered in connection with the accompanying drawing.

In the drawing, Figs. 1 to 3 illustrate apparatus arranged to operate in accordance with the principles of my invention. Figs. 4 to 6 illustrate a modified form of apparatus whereby the temperatures of the temperature responsive elements may be compared electrically.

The apparatus shown in Figs. 1 and 2 comprises a container or chamber 11 having an inlet 12 and an outlet 13 through which passes the gas to be investigated. The chamber is further conveniently formed into two sections 15 and 16 by means of a shield or baffle member 17 having perforations 17' therein and composed of a suitable material such as polished aluminum. By using a material of this character radiation may be reduced to a minimum. It is well known to those skilled in the art that a surface such as that of a polished aluminum plate is a highly efficient reflector of radiant energy and has a proportionately low capacity for absorption of radiant energy. Such a baffle, therefore, greatly diminishes radiation from one section to the other of the chamber 11 and likewise diminishes radiation from an object in one section to an object in the other. Each of the sections 15 and 16 communicates with the inlet and outlet 12 and 13, respectively.

I provide a differential temperature measuring device for comparing the temperatures of the surrounding gas in each of the sections 15 and 16 of the chamber 11. In the illustrated embodiment this comprises a manometer M including a tube 18 of U-shape terminating at its ends in bulbs 19 and 20, which bulbs are mounted in sealed relation in the sections 15 and 16, respectively. In the bottom portion of the tube 18 mercury or other liquid 21 is placed and the resulting mercury column serves as an indicator of the temperature difference. The bulbs or sealed containers 19 and 20 are filled with a gas such as hydrogen, nitrogen or argon which will respond by pressure differences to the difference in temperature between or the ratio of the temperatures of the two bulbs. This will cause a shift of the mercury column until the pressures are again balanced.

About one of the bulb or sealed containers, such as 20, there is positioned a heating element 22 in the form of a coil to which heat is supplied at a uniform rate. The maintenance of constancy of heat input to the coil 22 being important as a calibration characteristic of the device, the coil is therefore adapted to be energized from a suitable source of regulated voltage which in the illustration shown comprises a voltage regulating transformer T energized by a source of alternating current 23 and consisting essentially of a capacitor C and a winding P in series, the winding P having a saturable core which is operated above the point of saturation. Thus, if variations in the voltage of the source 23 take place, while the current flowing through the winding P and the capacitor C in series will vary, the flux in the core and the voltage induced in the secondary winding S will remain substantially constant. The regulated or substantially constant voltage provided by the secondary winding S is connected to the heater coil 22 through a control rheostat 24. It is also preferable that these parts be composed of a resistance material having a zero temperature coefficient of electrical resistivity.

The differential temperature measuring device M is provided with a scale 25 for indicating the height of the mercury column 21 in terms of the percentage or degree of purity of the gas being investigated. The temperature measuring device is further provided with a series of contact elements 26, 27 and 28 which make contact with the mercury column 21 under certain conditions of operation presently to be described.

In operation, assume that the gas to be investigated is being passed through the chamber 11 and that it flows therethrough in the two similar sections 15 and 16. Assume further that the heating element 22 is energized to supply heat to the bulb 20. Since both of the bulbs or sealed containers 19 and 20 are continuously surrounded by the gas to be tested, the temperature difference between the bulbs is determined by the thermal conductivity of the gas enclosed between them and the outer enclosing envelope 11 where radiation takes place. The lower the thermal conductivity of the gas being tested, the greater will be the temperature difference between the two bulbs 19 and 20.

As an illustration, assume that it is desired to determine the percentage purity of a gas such as hydrogen in a mixture with air. On account of the fact that the thermal conductivity of hydrogen is approximately 6 or 7 times that of dry air, the presence of pure hydrogen in the enclosing envelope 11 will cause a minimum temperature difference between the two bulbs due to rapid radiation from the bulb 20 and conduction through the gas of the heat delivered to the bulb 20 by the heating element 22. If now the hydrogen is removed and air substituted, because of the lower thermal conductivity or improved insulating qualities of air as compared to that of hydrogen, the heat delivered to the heated bulb 20 will be dissipated at a proportionally lower rate with the result that the temperature difference between the two bulbs will greatly increase. Intermediate values of dilution of the hydrogen with air will produce corresponding intermediate thermal conductivities, thus making it possible to calibrate the device in percentage or degree of purity of hydrogen with relation to the temperature difference between the two bulbs 19 and 20.

As already explained, upon a difference in temperature between the two bulbs 19 and 20, the pressure of the gases enclosed by the bulbs undergoes a relative change, thereby causing a shift of the mercury column 21 until the pressures are again in balance. The height of the mercury column thus becomes an indication of the purity of the hydrogen or other gas surrounding the two bulbs. By providing sealed-in contacts, such as 26 and 27 at definite points, for instance, at a point corresponding to 85 per cent purity of the gas being investigated, a visual or audible signal may be operated to warn of the approach of a dangerous condition. Fig. 3 illustrates the manometer M for this condition with the mercury column 21 shifted to close the contact 27 thereby energizing an indicator or signal device 29 through a circuit including a source of supply 30, the lower contact 26, and the mercury column 21.

When the mercury column 21 stands at the same height in each of the legs of the U corresponding to the condition where the pressures of the two bulbs 19 and 20 are equal, as depicted in Fig. 1, a second contact 28 is closed to energize an indicating or signaling device 31 from the source of supply 30 through a circuit including the lower contact 26 and the mercury column 21. The condition where the pressures of the two bulbs are equal can occur only if the energization of the heater circuit including the element 22 has been discontinued, in which case the gases in the bulbs will be at the same temperature, or if leakage or breakage of the bulb members 19 and 20 occurs causing equalization of the pressures. This arrangement thus serves as an indication of the failure of the mechanism.

In Figs. 4 and 5 I have illustrated a modification in which a plurality of temperature responsive resistance elements are immersed in the surrounding gas in the sections 15 and 16 of the chamber 11. A type of temperature responsive device which may be used with highly satisfactory results is one of the character described and claimed in a copending application of Chester I. Hall, Serial No. 281,856 filed June 29, 1939, entitled "Temperature responsive device." A device of this type, as indicated by the reference characters 35 and 36, is positioned in each of the sections 15 and 16 of the chamber 11, respectively, and about one of the temperature responsive devices such as 36, there is provided a heating element 22 energized from the source 23 through a variable impedance device 24, as already described.

As indicated in the sectional elevation view of Fig. 5, each of the temperature responsive devices 35 and 36 comprises a pair of electrodes 37 and 38 spaced from each other. The inner electrode 37 is in the form of a core while the outer electrode 38 is in the form of a cylinder closed at one end. Interposed between the electrodes 36 and 37 and fused or intimately bonded to the surfaces thereof is a mass 39 composed of a suitable material which undergoes a variation in resistance with changes in temperature. Various compositions may be employed for the resistance material to give different desirable physical characteristics, an example of which is illustrated by the materials disclosed in the co-pending application already referred to. However, various other resistance materials are well known in the art and it is not my intention to limit the invention to the employment of any particular composition of resistance material in the thermo-sensitive elements.

As illustrated in Fig. 5, the temperature responsive elements 35 and 36 are mounted in the wall portion 40 of the chamber 11 and electrically insulated therefrom by a suitable means such as a sleeve 41. A pair of terminals 42 and 43 connected respectively to the electrodes 37 and 38 are suitably mounted in an insulated member 44. Devices employing resistance materials of the character disclosed in my copending application are characterized by comparatively large variations in resistance with temperature changes and for this reason they are highly satisfactory for use in carrying out the principle of my invention.

I provide suitable means for determining the ratio of the resistances of the elements 35 and 36 with variations in temperature. As illustrated in Fig. 6, the temperature sensitive elements 35 and 36 are connected in series circuit relation with each other and in parallel relation with the secondary winding 45 of a transformer 46 in a Wheatstone bridge circuit. The transformer 46 is energized through its primary winding 47 by a substantially constant alternating current source of supply 48. Connected between the two temperature sensitive elements 35 and 36 and the mid-section of the secondary winding 45 and influenced by the unbalanced condition of the bridge is a suitable current responsive device 49 having a pointer 50 cooperating with an indicating scale 51. A variable connection 52 may be provided for adjusting the instrument 51 to give the desired scale reading for known conditions.

The current responsive device 49 is illustrated as being of the contact-making type having a down-scale contact 28' and an up-scale contact 27' which cooperate with a movable contact 26' carried by the pointer 50. A suitable contact-making instrument which may be employed is one of the character described in the United States Letters Patent to Richard Dietze, No. 1,913,194. The contacts 27' and 28' may be made adjustable to close at predetermined values of current which, taking the foregoing illustration as an example, would be at a value of current corresponding respectively to 85 per cent purity and that value of current corresponding to the condition when the resistance or temperature of both elements 35 and 36 are equal.

In operation, the resistance elements 35 and 36 are heated from the source of supply 45, heat is also applied to the element 36 by the auxiliary heating element 24, and a calibration of the instrument 49 is made using gases of known constituents. For the normal operating condition, in the illustration given, the connection 52 may be adjusted so that the pointer 50 occupies some intermediate position with reference to the contacts 27' and 28'. Then when the percentage purity of the constituent being tested drops to a predetermined minimum value, such, or instance, as the 85 per cent value in the case of hydrogen in air, the contacts 26' and 27' will close to operate the visual or audible signal 29 to warn of the approach of a dangerous condition. Similarly, the contact 28' may be adjusted to make contact with the movable contact 26' for the condition when either the energization of the bridge or the heater circuit to the element 36 has been discontinued, thereby energizing the visual or audible signal 31 to indicate failure of the mechanism. When the heater circuit is discontinued the two thermo-sensitive elements will then be at the same temperature. The bridge may, therefore, be so adjusted that the contacts 26' and 28' close for this condition.

Because of the fact that the rate of heat dissipation from the heated bulb 20 or the element 36 will also depend to a certain extent upon the rate of flow of the gas through the chamber 11, it will be appreciated that the rate of flow should be maintained substantially constant. Any suitable device may be employed for this purpose, many of which are well known to those skilled in the art.

It may be pointed out that the gas entrance and exits to the chamber 11 may be positioned at 90 degrees to their present positions so that the gas enters and leaves on each side of the baffle member. In this event, however, the baffle need not be perforated provided the gas is uniformly delivered to both sections of the chamber.

In accordance with the present invention wherein both of the temperature responsive elements are immersed in the same gas corresponding to the gas to be tested and the device is initially calibrated with reference to known purities of this gas, the necessity of maintaining a standard seal is avoided, and the amount of change or variation between the two temperature sensitive elements with variations in purity, is greatly increased thereby providing a more sensitive device.

While I have illustrated my invention for use in determining the percentage purity of hydrogen in air, such for example as might be usefully employed in connection with the operation of hydrogen cooled dynamo electric machines, I wish to point out that my invention has numerous other useful applications. It may be stated generally that the invention may be used with highly satisfactory results in those instances where the components of the gas differ materially in thermal conductivity. For example, it may be used in the determination of hydrogen in electrolytic oxygen, hydrogen in electrolytic chlorine, and oxygen in electrolytic hydrogen. Other illustrations of useful applications are the determination of the percentage of hydrogen in water gas and in the mixture of nitrogen, hydrogen, and carbon monoxide existing in one of the synthetic ammonia processes. The conductivities of nitrogen and carbon monoxide lie very close together while that of hydrogen is relatively very great. Consequently, the relative proportions of nitrogen and carbon monoxide make little difference in the determination of the amount of hydrogen present. The same relation is practically true in the case of the determination of carbon dioxide in boiler flue gases so that this also forms a useful field of application. These gases are composed principally of water vapor, carbon dioxide, oxygen, nitrogen and sometimes small amounts of carbon monoxide. The thermal conductivities of nitrogen, oxygen, and carbon monoxide are of nearly the same values while that of carbon dioxide is considerably lower. The device may also be successfully applied to the determination of the amount of air in balloon gas, and also to the testing of the porosity or permeability of balloon or other fabrics by adapting the device in accordance with the teachings of the Shakespear Patent 1,304,208.

While I have illustrated and particularly described certain embodiments of my invention and certain methods embraced therein for the purpose of explaining its principle and showing its application, it will be obvious to those skilled in the art that many modifications and variations are possible and I intend in the appended claims to cover all such modifications and variations which do not depart from the spirit and scope of my invention.

What I claim as new and desire to secure by Letters Patent of the United States is:

1. In gas analysis apparatus, a chamber adapted to contain a gas having a known constituent the percentage purity of which is to be investigated, a plurality of devices positioned in said chamber in spaced relation and exposed to said gas, said devices each having a characteristic which is variable in accordance with changes in temperature, means for applying heat to one only of said devices, and means responsive to temperature variations in said devices.

2. In a device for determining the percentage of a constituent of a gaseous mixture, a chamber containing said gaseous mixture, a plurality of thermo-sensitive elements positioned in spaced relation in said chamber and exposed to said gas, means for applying heat to one only of said elements, and means for obtaining a measurement of the temperature variations in said elements.

3. In apparatus for the detection and measurement of gases, a chamber containing the gas to be tested, a pair of thermo-sensitive elements positioned in said chamber in spaced relation and exposed to said gas, a radiation diminishing baffle member mounted between said thermo-sensitive elements, means for applying heat to one of said thermo-sensitive elements, and means responsive to the temperature difference between said thermo-sensitive elements.

4. In gas analysis apparatus, a chamber adapted to contain a gas the percentage purity of one constituent of which is to be tested, a plurality of devices positioned in said chamber in spaced relation and exposed to said gas, said devices having characteristics which vary in accordance with changes in temperature, a heater in thermal relation to one of said devices, and means responsive to a predetermined difference in the characteristics of said devices.

5. In a device for determining the percentage purity of a known constituent in a gaseous mixture, a chamber containing said gaseous mixture, a plurality of thermo-sensitive elements positioned in spaced relation in said chamber and exposed to said gas, means for applying heat to one of said elements, and means in thermal relation to these elements responsive to equalization of the temperatures thereof for indicating a discontinuance of operation of said heat applying means and a state of inoperativeness of the device.

6. In gas analysis apparatus, a chamber adapted to contain a gas having a known constituent, the percentage purity of which is to be investigated, a plurality of devices positioned in said chamber in spaced relation and exposed to said gas, the said devices each having a characteristic which is variable in accordance with changes in temperatures, a radiation diminishing shield between said devices, a heater in thermal relation to only one of said devices, and a characteristic-measuring device in operative relation to both of said devices for producing an effect responsive to variation in relative characteristics of said devices when the gas to which they are exposed is changed.

CHESTER I. HALL.